No. 738,551. PATENTED SEPT. 8, 1903.
R. J. LAY.
WHIFFLETREE CONNECTOR FOR TRACES.
APPLICATION FILED NOV. 6, 1902.
NO MODEL.
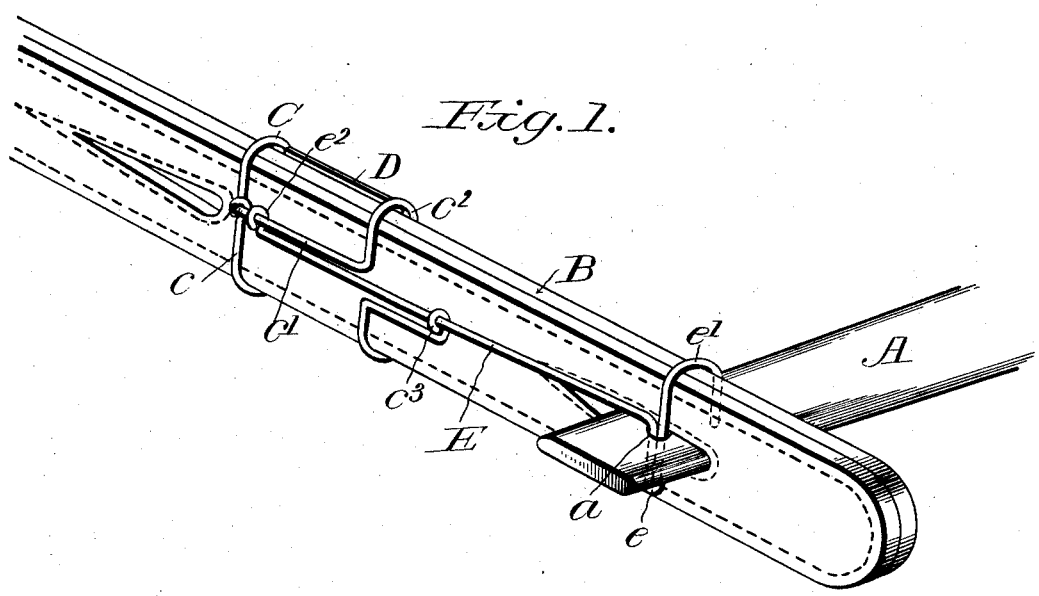
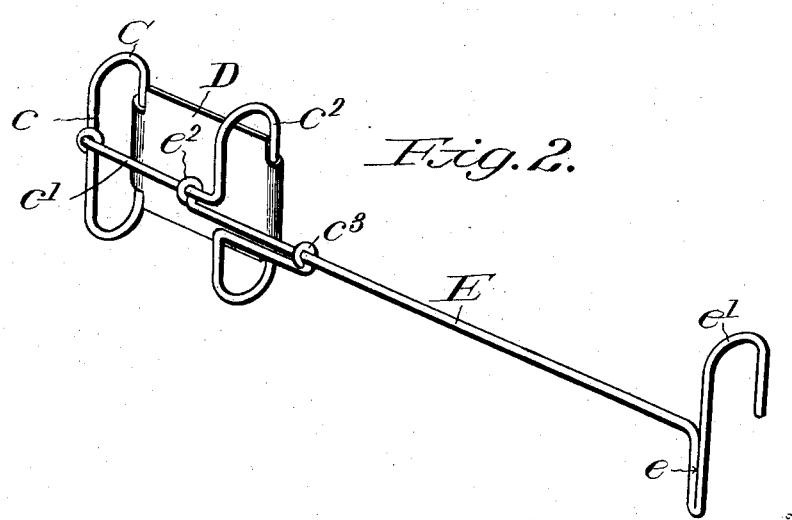
Witnesses
C. H. Walker
H. H. Johnson
Inventor
Robert J. Lay
By Eugene H. Johnson
Attorney.

No. 738,551. Patented September 8, 1903.

UNITED STATES PATENT OFFICE.

ROBERT JAMES LAY, OF CAIRO, WEST VIRGINIA.

WHIFFLETREE-CONNECTOR FOR TRACES.

SPECIFICATION forming part of Letters Patent No. 738,551, dated September 8, 1903.

Application filed November 6, 1902. Serial No. 130,221. (No model.)

*To all whom it may concern:*

Be it known that I, ROBERT JAMES LAY, a citizen of the United States, and a resident of Cairo, Ritchie county, West Virginia, have invented new and useful Improvements in Whiffletree-Connectors for Traces, of which the following is a specification.

This invention appertains to trace attachments, the object thereof being to provide a simple, cheap, and effective device which is carried by the trace and adapted to engage therewith and with the whiffletree to prevent the removal of the trace from the whiffletree, as will be hereinafter set forth, and specifically pointed out in the claims.

In the accompanying drawings, which illustrate one approved form of my invention, Figure 1 is a perspective view showing the application of the invention to a trace, the hooked end thereof being passed through the eye of the whiffletree; and Fig. 2 is a perspective view of the attachment separated from the trace.

A refers to a whiffletree or swingletree which is provided and has near its end an aperture or eye $a$, and the trace B, to which my improvement is applied, is of ordinary construction. The attachment for holding the trace in engagement with the whiffletree is preferably made up of two pieces of wire, one piece C being bent upon itself to provide a closed loop $c$, connected by a bar $c'$ to an open loop $c^2$, the end of which is formed into an eye $c^3$, positioned slightly below the plane of the bar $c'$. The two loops may be connected by a metallic plate D, which serves to connect the rear members of the loops, as well as providing a plate to receive name, trade-mark, or other such matter as it may be desired to impress thereon. The end members of the plate are coiled about the rear vertical members of the loops. By the construction shown the bar $c'$, which extends slightly outward beyond the front members of the loops, provides a slide-bar, which is embraced by the eye $C^2$ of the spring-hook-carrying member.

The hook member E is made up of a single piece of resilient or spring wire, which is bent upon itself to provide a pin $e$, one of the parts thereof extending upward and being bent upon itself to provide a hook $e'$, which is adapted to overlie the trace, as shown in dotted lines in Fig. 1. The part E after having been passed through the eye or loop $c^3$ is formed into an eye or loop $e^2$, which is in sliding engagement with the bar $c'$.

The two parts D and E are made up of spring-wire of a suitable gage, and the loops may be adjusted upon the trace and are held thereon by their own resiliency. The trace is passed through the loops, so that the hook on the end of the member E will overlie the trace. By moving the loop or hook section to occupy the position shown in Fig. 2 the end of the member E can be readily raised, so that the pin $e$ may be passed through the eye of the whiffletree and retain the trace thereon. When the loops are moved toward the whiffletree an upward movement of the retaining-pin will be prevented, and the inherent spring of the bar E will tend to clamp the open loop upon the trace.

The device hereinbefore described is simple in construction, may be cheaply manufactured, and is readily applied without in any way changing the construction of the trace or whiffletree, and the loop member is slidable upon the trace, and should the trace be twisted the hooked member E may follow such twisting movement of the trace without being bent, as it will turn with the trace.

Having thus described my invention, I do not wish to limit myself to the precise construction or arrangement of the parts, as they may be varied within the spirit and scope of my claim.

I claim—

1. A trace attachment, comprising a one-piece member shaped to present trace-engaging loops and a connecting-bar, a terminal portion of one of the loops being on a different plane from the connecting-bar, and a hooked member held in slidable engagement with the end of the open loop and the connecting-bar, for the purpose set forth.

2. A trace-holder for connecting a trace to a whiffletree comprising a member having a closed loop and an open loop which are connected by a cross-bar, an eye formed on the terminal of the open loop, a hooked member which is passed through the aforesaid eye and is held in sliding engagement with the crossbar such member having a hook for engagement with the trace and a part which is adapted to be passed through the eye of the whiffletree, substantially as shown.

In testimony whereof I have hereunto set my hand in the presence of two subscribing witnesses.

ROBERT JAMES LAY.

Witnesses:
 A. J. WILSON,
 W. J. MARTIN.